W. T. CARDWELL.
CAMERA.
APPLICATION FILED JULY 24, 1918.

1,341,543.

Patented May 25, 1920.
2 SHEETS—SHEET 1.

Inventor
Walter T. Cardwell
By Victor J. Evans
Attorney

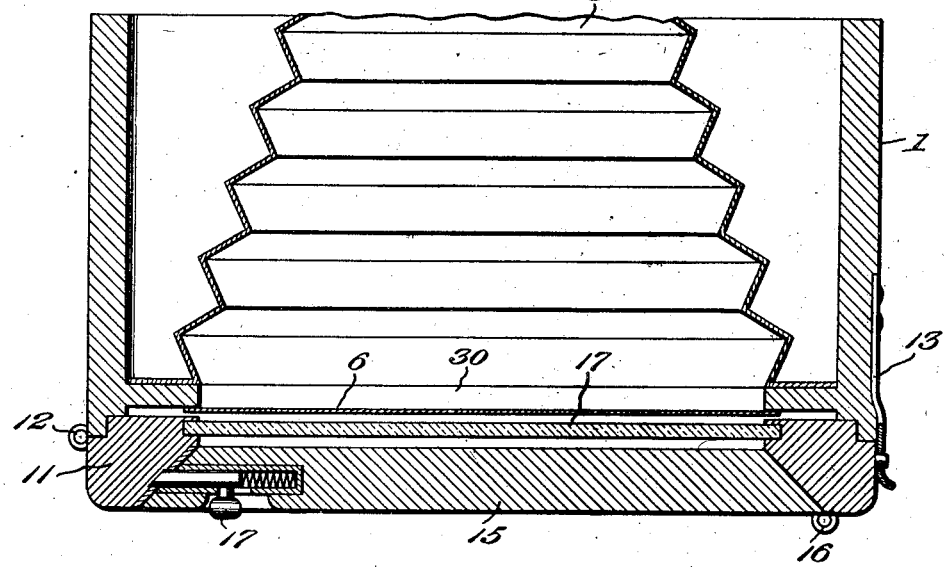
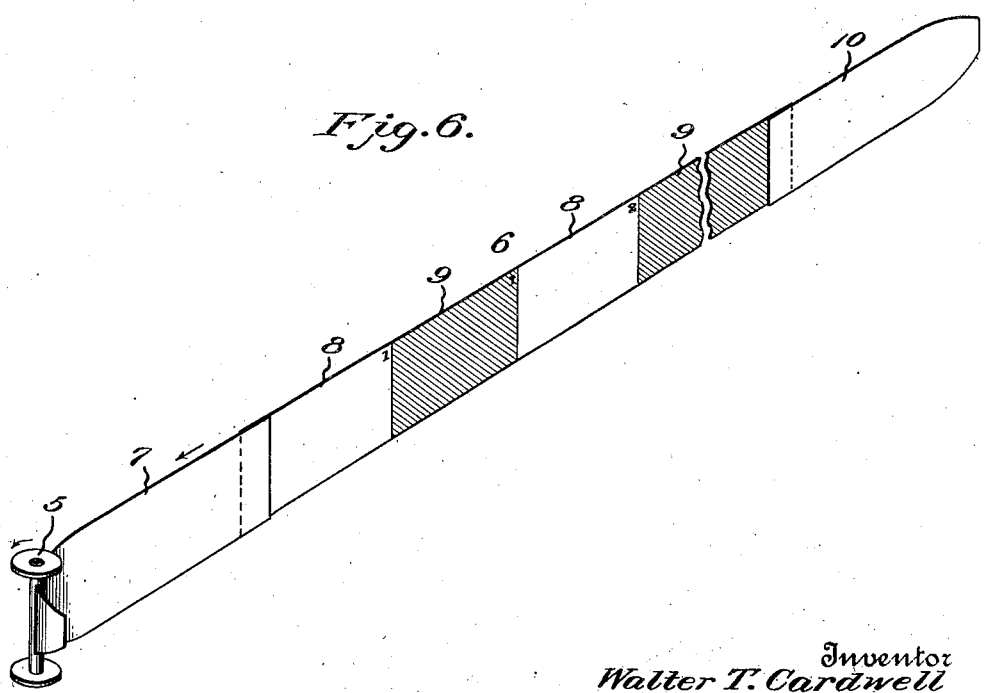

UNITED STATES PATENT OFFICE.

WALTER T. CARDWELL, OF BIRMINGHAM, ALABAMA.

CAMERA.

1,341,543.  Specification of Letters Patent.  Patented May 25, 1920.

Application filed July 24, 1918. Serial No. 246,588.

*To all whom it may concern:*

Be it known that I, WALTER T. CARDWELL, a citizen of the United States, residing at Birmingham, in the county of Jefferson and State of Alabama, have invented new and useful Improvements in Cameras, of which the following is a specification.

My present invention pertains to roll film photographic cameras; and it has for its object to provide in a roll film camera, means whereby such a camera may be nicely or correctly focused with the same facility as an ordinary plate camera, and this without in any measure impairing the film.

The invention also contemplates the provision of a back improvement forming part thereof and attachable to roll film cameras such as at present in use with a view to transforming such cameras into cameras adapted to be expeditiously and easily focused.

Other objects and advantageous features of the invention will be fully understood from the following description and claims when the same are read in connection with the drawings accompanying and forming part of this specification, in which:

Figure 1 is a rear elevation of a camera constituting one embodiment of my invention.

Fig. 2 is a vertical section of the same on line 2—2 of Fig. 1 but with the spools, film, plates 19 and pads 21 in elevation.

Fig. 5 is an enlarged cross-section taken in the plane indicated by the line 5—5 of Fig. 1 and showing the proper width of the film employed and the relative arrangement of the same in the camera.

Fig. 6 is a reduced, broken, perspective of the film that I prefer to employ; the said film *per se* constituting the subject of my contemporary application, filed July 24, 1918, Serial No. 246,589.

Similar numerals of reference designate corresponding parts in all of the views of the drawings.

Figure 1:
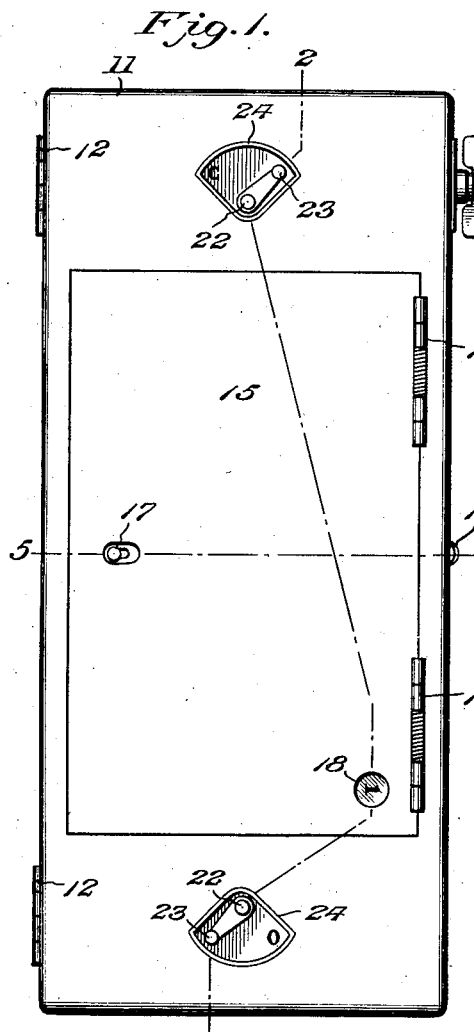
Figure 2:
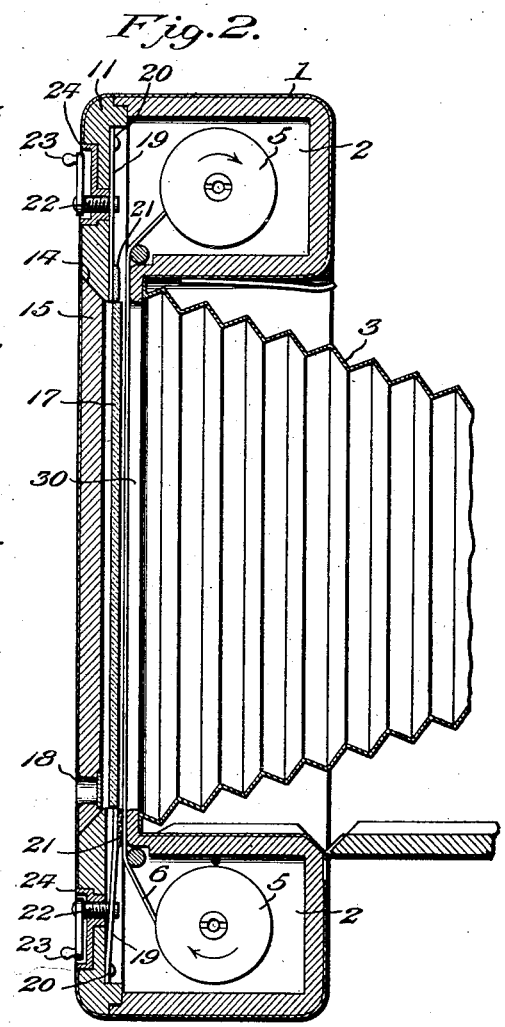
Figure 3:
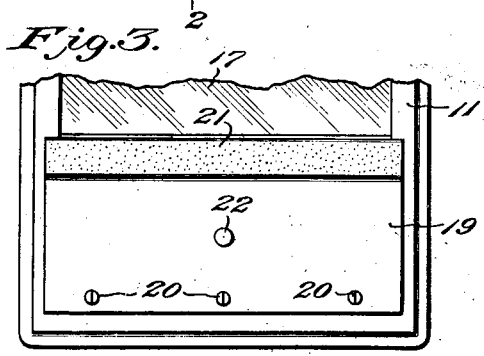
Fig. 3 is a detail fragmentary elevation showing one of the film protecting and locking devices comprised in the improvement.
Figure 4:
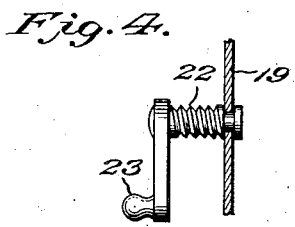
Fig. 4 is an enlarged detail showing the actuating means for the film locking and protecting device.

The camera casing or body 1 is provided at 2 with the usual spool boxes, and is otherwise, in the preferred embodiment of my invention, of the ordinary well-known construction. It is also equipped with the usual or any preferred bellows 3, and with the ordinary or any other suitable means 4 for winding or moving the film.

Shown disposed in the spool boxes 2 are spools 5, and extending between the said spools and back of the bellows 3 is the film 6. The said film is preferably of the construction best shown in Fig. 6, that is to say it comprises a paper section 7 for connection to the upper spool 5, and alternate transparent and sensitized sections, of celluloid or other suitable material; the said alternate transparent and sensitized sections being numbered 8 and 9 respectively, and the pairs of complementary transparent and sensitized sections being preferably equipped with numbers in regular sequence, as shown in Fig. 6, for convenience in operating the camera as will hereinafter appear. The sensitized section of the film remote from the paper portion 7 is provided with a paper terminal portion 10 so that when the film has been completely taken up on the upper roll 5, removal of the said roll from its box 2 will not be attended by exposure of the sensitive portions of the film to the light. On the other hand the paper portion 10 by resting snugly between the flanges of the top roll 5 will preclude the access of light to the sensitive film portions that it incloses.

I prefer to employ a back 11 as illustrated in connection with the casing body 1 and to utilize the said back for carrying certain elements of my improvement.

I would also have it here understood that the said back may be connected with and fastened in closed position upon the body 1 in any approved manner, and that in some instances the back may be so constructed that it may be employed to apply my invention to roll film camera boxes or casings such as at present in use. The back 11 illustrated is hinged at 12 to the casing body 1 and is designed to be detachably fastened in closed position at the point 13, but these are to be understood as immaterial features to which my invention is not confined.

At 14 the back 11 is provided with an opening which is normally closed by a door 15, hinged at 16 and detachably fastened in closed position by a fastener 17ª. It will also be noted that in the opening 14 and immediately in front of the door 15 the back 11 is equipped with a ground glass plate 17, suitably secured therein. The door 15 is formed at 18 with a glazed opening through the medium of which the operator is enabled to observe the number on the portion of film opposite the ground glass plate 17, with a view to assuring accuracy in the operation of the camera.

Experience has demonstrated that black numerals on the film can be readily read through the ground glass plate 17 and the glazed opening 18.

Carried at the upper and lower portion of the back 11 are film locking and protecting devices which respectively comprise resilient plates 19, connected at 20 to the back, each carrying a pad 21, of suitable material, arranged to be opposed to and secured against the film. The said locking and protecting devices are adapted to be adjusted and adjustably fixed through the medium of screws 22 which bear in the back, are swiveled in the plates 19 and are provided with cranks 23 for the convenient manipulation thereof. The said cranks 23 are disposed in recesses 24, and the said recesses are preferably provided with initials "C" and "O," as shown to indicate when the locking and protecting devices are in use and when the same are idle.

In the practical use of my novel camera, the film is taken up on the upper roll 5 until the numeral 1 on the first transparent section 8 is in registration with the sight opening 18 in the door 15. At that time the transparent section of the film will rest entirely in front of the plate 17 and in rear of the opening 30 at the back of the bellows 3. When, with the film positioned as stated, it is desired to take a picture, the door 15 is opened and then by observing the prospective picture on the plate 17 and adjusting the lens, (not shown) at the forward end of the bellows 3 the operator is enabled to accurately and nicely focus the camera whereupon the door 15 is closed and the film is moved until the numeral 1 on the first sensitized section 9, of the film is opposite the opening 18, when the operator will be apprised of the fact that the section is in correct position to receive the picture and the picture is then taken in the ordinary well-known manner.

Precedent to the opening of the door 15 at the time stated the pads 21 of the locking and protecting devices 19 are secured against the film, this with a view to effectually preventing light gaining access to and injuring the sensitized sections of the film in the upper and lower roll boxes.

After the focusing is accomplished the locking and protecting devices are adjusted to release the film, but after the film is moved to correctly position the sensitized section that is to receive the picture the film is preferably again locked by adjustment of the devices 19, and I would here have it further understood that immediately after a picture is taken it is preferable to wind the film portion bearing the picture upon the upper roll 5 and to secure the devices 19 in working position so that there will be no liability of the sensitized portions of the film being injured when the door 15 is opened for the focusing of the next picture.

It will be gathered from the foregoing that by reason of my improvement the focusing of a roll film camera is a very simple matter and one that may be quickly and easily accomplished by adjusting the lens and observing the clearness of the prospective picture on the plate 17.

In this connection it will be noted that the film is shown in close proximity to the ground glass plate 17, and that it may be disposed even closer to the plate 17, so that a picture in focus on the ground glass will be in substantial focus on the film.

It will also be gathered that when equipped as described the back 11 may be employed in conjunction with ordinary roll film cameras with a view to adapting the said cameras when the same are equipped with films such as described, for ready and direct focusing.

Having described my invention, what I claim and desire to secure by Letters-Patent is:

1. A camera back having an opening and equipped with a flush door for normally closing said opening, a ground glass plate disposed in the opening and spaced from the rear side of the back, resilient plates carrying pads arranged at opposite ends of the glass, and screws bearing in the back at opposite sides of the opening and journaled in and held to the said plates.

2. In a camera the combination of a casing having roll boxes, a bellows in the casing, a back attached to the casing and having an opening in line with the bellows, a ground glass plate carried by the back and arranged in said opening and in spaced relation to the rear side of the back, a door for normally closing the opening in the back; said door when closed being flush with the back, and film protecting means carried by the back and arranged between the same and the roll boxes and adapted to clamp a film against the casing at opposite ends of the ground glass plate.

In testimony whereof I affix my signature.

WALTER T. CARDWELL.